United States Patent Office 3,132,126
Patented May 5, 1964

3,132,126
RESINOUS REACTION PRODUCTS OF UNSATURATED ACETAL AND CYCLIC FORMAL
Herbert I. Berman, Manheim Township, Lancaster County, Pa., assignor to Armstrong Cork Company, Lancaster, Pa., a corporation of Pennsylvania
No Drawing. Filed Jan. 10, 1961, Ser. No. 81,686
9 Claims. (Cl. 260—88.3)

This invention relates generally to resinous products, and more particularly to resinous products formed by the reaction of an unsaturated acetal and a cyclic formal.

The invention contemplates the resinous reaction product of an unsaturated acetal selected from the group consisting of diallylidene pentaerythritol and dicrotylidene pentaerythritol, and a cyclic formal selected from the group consisting of 1,3-dioxepane and 1,3-dioxocane.

The diallylidene pentaerythritol (DAPE) and dicrotylidene pentaerythritol (DCPE), which constitute a starting material of the present invention, are known compounds available commercially. They are acetals readily formed by the reaction of allyl aldehyde or crotyl aldehyde and pentaerythritol. The dicrotylidene pentaerythritol may also be named di-beta-methallylidene pentaerythritol.

The two formals, either one of which or mixtures thereof, which constitute the other starting material, are readily prepared. The 1,3-dioxepane is prepared by the reaction of 1,4-butanediol with paraformaldehyde, usually in the presence of a catalyst, such as a mixture of paratoluene sulfonic acid and N-methyl morpholine, at a temperature in the range of 100°–190° C. The resulting formal is washed, dried, distilled, and used. The 1,3-dioxocane is prepared in the same manner using 1,5-pentanediol as the starting ingredient. The formulae for these two cyclic formals are as follows:

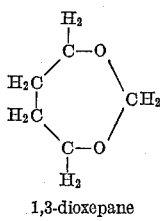
1,3-dioxepane

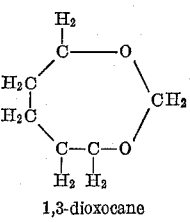
1,3-dioxocane

The amount of DAPE or DCPE to be used in the reaction may vary between about 95%–30% by weight based on the weight of DAPE or DCPE plus the cyclic formal. The flexibility of the resinous product may be controlled to a significant extent by varying the amount of the formal used within the limits stated above. Increasing amounts of the formal increase the flexibility of the product. Amounts of DAPE or DCPE less than about 30% by weight produce a resinous product which is too sticky and soft. Amounts greater than about 95% by weight produce a very brittle resin much like polymeric DAPE formed in the absence of any copolymerizable material. The use of the formal as a copolymerizing monomer imparts highly desirable properties of flexibility to the resinous reaction product.

The reaction is carried out in the presence of a strong acid catalyst, such as the Lewis acids. Any of the catalysts described in Plastics Institute, Transactions and Journal, 28, No. 75, page 131, 1960, are operable. The catalyst will generally be used in an amount of about 0.2%–5% by weight catalyst based on the weight of DAPE or DCPE plus formal. Small amounts of water are highly desirable in conducting the reaction. The water will generally be present in an amount of about 5%–150% by weight water based on the weight of the catalyst used in any particular reaction.

The reaction is carried out in a straightforward manner. The DAPE or DCPE is best softened or melted by heat (melting point 41° C.), mixed with the formal, and the water and catalyst added to the mixture. The catalyst and water may be mixed separately and added as a mixture, or the water may be added first. It is generally preferred not to add the catalyst in the absence of the water. The reaction may generally be classified as a room temperature reaction since it is carried out in the range of about 20°–35° C. with lower temperatures requiring longer times for completion. The time for completion also varies depending on catalyst changes in kind or amount, and the water concentration within the above-stated limits.

When the mixture of DAPE or DCPE, formal, water, and catalyst is homogeneous, the mixture may be poured into a shaped mold to form such objects as screw-type bottle caps, or the mixture may be cast as a film on any desired surface, such as wood, flooring, metals, and glass. A cast film formed in accordance with the present invention is useful as the interior film in the formation of a shatter-proof glass laminate.

The following examples illustrate several embodiments of the invention. All parts are by weight unless otherwise stated:

Example 1

To 15 parts DAPE was added 6 parts 1,3-dioxepane followed by the addition of a mixture of 0.5 part water and 0.56 part boron trifluoride diethyl etherate. After thorough mixing, the mixture was allowed to stand at 24° C. for 5 days. At the end of that time, there was formed a hard, tough specimen which could not be bent or broken with the fingers.

The run was repeated using 10 parts DAPE and 11 parts 1,3-dioxepane, all other conditions being the same. The resulting specimen was tough and strong but could be bent slightly with the fingers.

Example 2

To 15 parts diallylidene pentaerythritol was added 6 parts 1,3-dioxocane, followed by the same catalyst system as used in Example 1. After 5 days of curing at 240° C., a tough, strong, and light amber-colored specimen resulted.

When the run was repeated using 10 parts DAPE and 11 parts 1,3-dioxocane, a strong, flexible specimen resulted.

Example 3

A series of runs was made using the following ingredients in the following amounts:

| Ingredients | Run 1, Parts | Run 2, Parts | Run 3, Parts | Run 4, Parts |
|---|---|---|---|---|
| DAPE | 18 | 16 | 14 | 12 |
| 1,3-dioxepane | 3 | 5 | 7 | 9 |
| Water | 0.5 | 0.5 | 0.5 | 0.5 |
| $BF_3OEt_2$ | 0.56 | 0.56 | 0.56 | 0.56 |

Increasing flexibility was apparent with increasing 1,3-dioxepane. Shore A2 hardness of run 1 was 100 (maximum on the gauge) ranging down to 55 for run 4.

Tackiness in the final product is minimized by curing in an inert atmosphere.

Example 4

Two runs were made as in Example 1 with the following ingredients:

| Ingredients | Run 1, Parts | Run 2, Parts |
|---|---|---|
| DCPE | 48 | 40 |
| 1,3-dioxepane | 14 | 22 |
| Water | 2.0 | 2.0 |
| $BF_3OEt_2$ | 1.7 | 1.7 |

On standing at room temperature (24° C.) for 6 days, both specimens were tough and flexible.

Example 5

There were mixed 77 parts DAPE and 48 parts 1,3-dioxepane, followed by the addition of a mixture of 4 parts water and 3.4 parts $BF_3OEt_2$.

The mixture was spread on a piece of glass. A second piece of glass was placed on top of the soft film. A firm bond formed in 3 days at room temperature. The resulting laminate was clear after 72 hours' exposure to an ultraviolet lamp and after 24 hours' total immersion in cold water.

The run was repeated, save that a piece of cheesecloth was placed on the soft film. The second piece of glass was placed over the cheesecloth. A firm bond was established in 5 days at room temperature, forming a shatterproof glass laminate of attractive appearance. The run was repeated using a sheet of paper instead of cheesecloth. Again, a firm bond was established in 5 days.

The run was repeated wherein the soft film was spread on an aluminum surface. A second piece of aluminum was placed against the film. A firm bond developed on standing at room temperature for 4 days.

I claim:

1. The resinous reaction product of an unsaturated acetal selected from the group consisting of dicrotylidene pentaerythritol and diallylidene pentaerythritol, and a cyclic formal selected from the group consisting of 1,3-dioxepane and 1,3-dioxocane.

2. A product according to claim 1 containing between 95%–30% by weight of said unsaturated acetal.

3. A product according to claim 1 wherein said cyclic formal comprises 1,3-dioxepane.

4. A resinous product according to claim 1 wherein said cyclic formal comprises 1,3-dioxocane.

5. The method of forming a resinous reaction product which comprises blending an unsaturated acetal selected from the group consisting of dicrotylidene pentaerythritol and diallylidene pentaerythritol, and a cyclic formal selected from the group consisting of 1,3-dioxepane and 1,3-dioxocane, in the presence of a strong acid catalyst and water, and allowing the resulting mixture to stand for sufficient time to cure.

6. The method according to claim 5 wherein said unsaturated acetal is present in an amount of about 30%–95% by weight based on the weight of said unsaturated acetal plus the cyclic formal.

7. The method according to claim 5 wherein said catalyst is used in an amount of about 0.2%–5% by weight based on the weight of the unsaturated acetal plus the formal.

8. The method according to claim 7 wherein water is present to the extent of about 5%–400% by weight water based on the weight of the catalyst.

9. A glass laminate comprising sheets of glass bonded with the resinous reaction product of an unsaturated acetal selected from the group consisting of dicrotylidene pentaerythritol and diallylidene pentaerythritol, and a cyclic formal selected from the group consisting of 1,3-dioxepane and 1,3-dioxocane.

References Cited in the file of this patent

UNITED STATES PATENTS 2,913,435     Guest et al. _____ Nov. 17, 1959

UNITED STATES PATENT OFFICE
CERTIFICATE OF CORRECTION

Patent No. 3,132,126                      May 5, 1964

Herbert I. Berman

It is hereby certified that error appears in the above numbered patent requiring correction and that the said Letters Patent should read as corrected below.

Column 2, lines 46 and 47, for "240° C." read -- 24° C. --.

Signed and sealed this 8th day of September 1964.

(SEAL)
Attest:

ERNEST W. SWIDER                      EDWARD J. BRENNER
Attesting Officer                      Commissioner of Patents